US012810574B2

(12) United States Patent
Cui et al.

(10) Patent No.: US 12,810,574 B2
(45) Date of Patent: Nov. 24, 2026

(54) METHOD, APPARATUS, DEVICE AND STORAGE MEDIUM FOR IMAGE SEGMENTATION

(71) Applicant: Beijing Youzhuju Network Technology Co., Ltd., Pinggu District (CN)

(72) Inventors: Quan Cui, Beijing (CN); Muyang Yi, Beijing (CN); Hao Wu, Beijing (CN); Cheng Yang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 256 days.

(21) Appl. No.: 18/634,560

(22) Filed: Apr. 12, 2024

(65) Prior Publication Data

US 2024/0346799 A1 Oct. 17, 2024

(30) Foreign Application Priority Data

Apr. 13, 2023 (CN) ........................ 202310396073.6

(51) Int. Cl.
*G06V 10/26* (2022.01)
*G06T 3/40* (2024.01)
(Continued)

(52) U.S. Cl.
CPC ................ *G06V 10/26* (2022.01); *G06T 3/40* (2013.01); *G06V 10/50* (2022.01); *G06V 10/764* (2022.01); *G06V 20/70* (2022.01); *G06V 10/7753* (2022.01)

(58) Field of Classification Search
None
See application file for complete search history.

(56) References Cited

U.S. PATENT DOCUMENTS 12,547,658 B2 * 2/2026 Zhang .................. G06F 16/532
2016/0012277 A1 1/2016 Tate et al.
(Continued)

FOREIGN PATENT DOCUMENTS

CN 108596915 A 9/2018
CN 112561053 A 3/2021
(Continued)

OTHER PUBLICATIONS

Morita et al., "Interactive Image Manipulation with Complex Text Instructions," arXiv:2211.15352v1 [cs.CV] Nov. 25, 2022 (Year: 2022).*

(Continued)

*Primary Examiner* — Soo Shin
(74) *Attorney, Agent, or Firm* — Alleman Hall LLP

(57) ABSTRACT

Embodiments of the disclosure provides technologies for image segmentation. The method includes: extracting an image feature representation of a target image using a trained image encoder; for each of a plurality of classes, generating, using a trained text encoder, a text feature representation corresponding to a name of the class, and determining a candidate segmentation map for the target image and a class confidence of the class based on the image feature representation and the text feature representation; selecting, from the plurality of classes, at least one class related to the target image based on a plurality of class confidences determined respectively for the plurality of classes; and determining a target segmentation map for the target image based on the at least one candidate segmentation map and the at least one class confidence determined for the at least one selected class.

20 Claims, 9 Drawing Sheets

(51) Int. Cl.

| | |
|---|---|
| ***G06V 10/50*** | (2022.01) |
| ***G06V 10/764*** | (2022.01) |
| ***G06V 10/774*** | (2022.01) |
| ***G06V 20/70*** | (2022.01) |

(56) References Cited

U.S. PATENT DOCUMENTS

| | | | | |
|---|---|---|---|---|
| 2021/0232773 | A1* | 7/2021 | Wang | G06F 40/284 |
| 2024/0013504 | A1* | 1/2024 | Yu | G06V 10/80 |
| 2024/0135509 | A1* | 4/2024 | Liu | G06T 5/77 |
| 2024/0161369 | A1* | 5/2024 | Li | G06T 11/60 |
| 2024/0419382 | A1* | 12/2024 | Dekel | G06V 20/70 |
| 2025/0299463 | A1* | 9/2025 | Shin | G06V 10/82 |
| 2026/0045107 | A1* | 2/2026 | Nguyen | G06V 20/70 |

FOREIGN PATENT DOCUMENTS

| | | | |
|---|---|---|---|
| CN | 115294427 | A | 11/2022 |
| CN | 115631205 | A | 1/2023 |
| CN | 115761235 | A | 3/2023 |

OTHER PUBLICATIONS

China National Intellectual Property Administration, Notice of Allowance Issued in Application No. 202310396073.6, Dec. 16, 2025, 7 pages.

Shotton, J. et al., "Semantic Texton Forests for Image Categorization and Segmentation," Proceedings of the 2008 IEEE Conference on Computer Vision and Pattern Recognition, Jun. 23, 2008, Anchorage, AK, 8 pages.

Yanan, C., "Research on Zero-Shot Fine-grained Image Classification based on Improved GAN," Master in Electronics Science and Technology Thesis, Xidian University, May 2021, 81 pages. Submitted with English abstract.

* cited by examiner

METHOD, APPARATUS, DEVICE AND STORAGE MEDIUM FOR IMAGE SEGMENTATION

CROSS-REFERENCE OF RELATED APPLICATION(S)

The present application claims priority to Chinese Patent Application No. 202310396073.6, filed on Apr. 13, 2023, and entitled "METHOD, APPARATUS, DEVICE AND STORAGE MEDIUM FOR IMAGE SEGMENTATION", the entirety of which is incorporated herein by reference.

FIELD

Example embodiments of the present disclosure are generally related to the field of computer science, and in particular to a method, an apparatus, a device, and a computer-readable storage medium for image segmentation.

BACKGROUND

Image segmentation, also known as image semantic segmentation, is a process of dividing an image into several regions with specific characteristics, to support extracting objects of interest from the image. The image segmentation is an important step for tasks ranged from image processing to image analysis. The result of image segmentation is to divide a digital image into disjoint regions. The process of image segmentation is also a labeling process, i.e., assigning the same number to pixels in a region belonging to the same class. Image segmentation methods are mainly divided into the following types: threshold-based segmentation methods, region-based segmentation methods, edge-based segmentation methods, and segmentation methods based on specific theories, etc.

SUMMARY

In a first aspect of the present disclosure, a method for image segmentation is provided. The method includes: extracting an image feature representation of a target image using a trained image encoder; for each of a plurality of classes, generating, using a trained text encoder, a text feature representation corresponding to a name of the class, and determining a candidate segmentation map for the target image and a class confidence of the class based on the image feature representation and the text feature representation, the candidate segmentation map indicating whether respective pixels in the target image are classified into the class; selecting, from the plurality of classes, at least one class related to the target image based on a plurality of class confidences determined respectively for the plurality of classes; and determining a target segmentation map for the target image based on the at least one candidate segmentation map and the at least one class confidence determined for the at least one selected class, the target segmentation map indicating whether respective pixels in the target image are classified into a class amongst the at least one class.

In a second aspect of the present disclosure, an apparatus for image segmentation is provided. The apparatus includes: an image feature extraction module configured to extract an image feature representation of a target image using a trained image encoder; a feature processing module configured to, for each of a plurality of classes, generate, using a trained text encoder, a text feature representation corresponding to a name of the class, and determine a candidate segmentation map for the target image and a class confidence of the class based on the image feature representation and the text feature representation, the candidate segmentation map indicating whether respective pixels in the target image are classified into the class; a class selection module configured to select, from the plurality of classes, at least one class related to the target image based on a plurality of class confidences determined respectively for the plurality of classes; and a segmentation map determination module configured to determine a target segmentation map for the target image based on the at least one candidate segmentation map and the at least one class confidence determined for the at least one selected class, the target segmentation map indicating whether respective pixels in the target image are classified into a class amongst the at least one class.

In a third aspect of the present disclosure, an electronic device is provided. The device comprises at least one processing unit; and at least one memory coupled to the at least one processing unit and storing instructions executable by the at least one processing unit. The instructions, upon execution by the at least one processing unit, cause the electronic device to perform the method of the first aspect.

In a fourth aspect of the present disclosure, a non-transitory computer-readable storage medium is provided. The computer-readable storage medium stores a computer program, which, when executed by a processor, implements the method of the first aspect.

It would be appreciated that the content described in the Summary of the present invention is neither intended to identify key or essential features of the embodiments of the present disclosure, nor is it intended to limit the scope of the present disclosure. Other features of the present disclosure will be readily envisaged through the following description.

BRIEF DESCRIPTION OF THE DRAWINGS

The above and other features, advantages and aspects of the embodiments of the present disclosure will become more apparent in combination with the accompanying drawings and with reference to the following detailed description. In the drawings, the same or similar reference symbols refer to the same or similar elements, in which.

DETAILED DESCRIPTION

Figure 1:
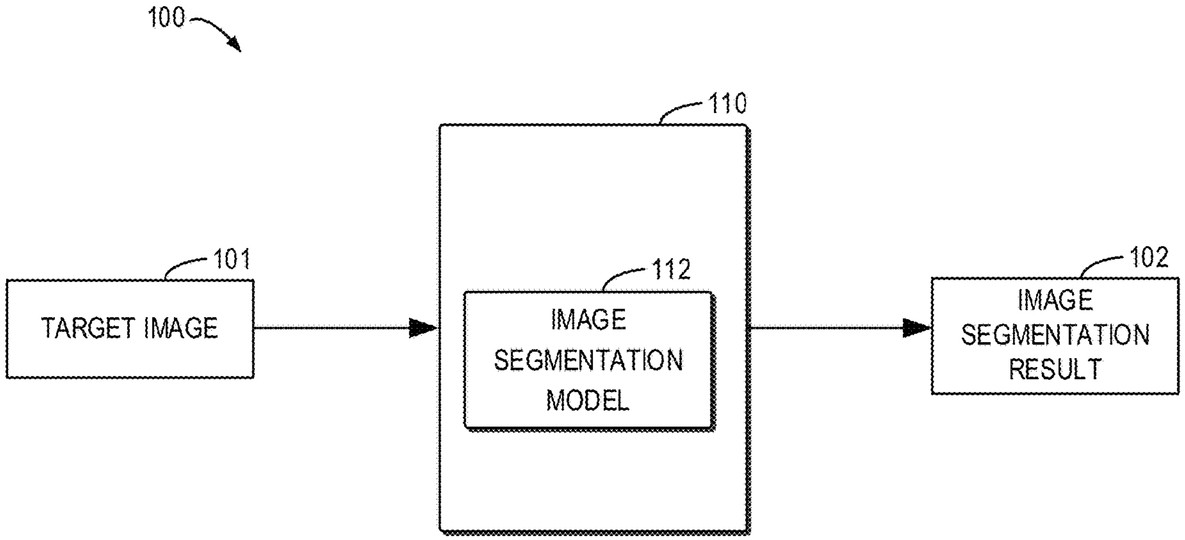
FIG. 1 illustrates a schematic diagram of an example environment in which embodiments of the present disclosure can be implemented.

The embodiments of the present disclosure will be described in more detail below with reference to the accompanying drawings. Although some embodiments of the present disclosure are shown in the drawings, it would be appreciated that the present disclosure may be implemented in various forms and should not be interpreted as limited to the embodiments described herein. On the contrary, these embodiments are provided for a more thorough and complete understanding of the present disclosure. It would be appreciated that the drawings and embodiments of the present disclosure are only for the purpose of illustration and are not intended to limit the scope of protection of the present disclosure.

In the description of the embodiments of the present disclosure, the term "including" and similar terms would be appreciated as open inclusion, that is, "including but not limited to". The term "based on" would be appreciated as "at least partially based on". The term "one embodiment" or "the embodiment" would be appreciated as "at least one embodiment". The term "some embodiments" would be appreciated as "at least some embodiments". Other explicit and implicit definitions may also be included below. As used herein, the term "model" can represent the matching degree between various data. For example, the above matching degree can be obtained based on various technical solutions currently available and/or to be developed in the future.

It will be appreciated that the data involved in this technical proposal (including but not limited to the data itself, data acquisition or use) shall comply with the requirements of corresponding laws, regulations and relevant provisions.

It will be appreciated that before using the technical solution disclosed in each embodiment of the present disclosure, users should be informed of the type, the scope of use, the use scenario, etc. of the personal information involved in the present disclosure in an appropriate manner in accordance with relevant laws and regulations, and the user's authorization should be obtained.

For example, in response to receiving an active request from a user, a prompt message is sent to the user to explicitly prompt the user that the operation requested operation by the user will need to obtain and use the user's personal information. Thus, users may select whether to provide personal information to the software or the hardware such as an electronic device, an application, a server or a storage medium that perform the operation of the technical solution of the present disclosure according to the prompt information.

As an optional but non-restrictive implementations, in response to receiving the user's active request, the method of sending prompt information to the user may be, for example, a pop-up window in which prompt information may be presented in text. In addition, pop-up windows may also contain selection controls for users to choose "agree" or "disagree" to provide personal information to electronic devices.

It will be appreciated that the above notification and acquisition of user authorization process are only schematic and do not limit the implementations of the present disclosure. Other methods that meet relevant laws and regulations may also be applied to the implementation of the present disclosure.

As used herein, the term "model" can learn a correlation between respective inputs and outputs from training data, so that a corresponding output can be generated for a given input after training is completed. The generation of the model can be based on machine learning techniques. Deep learning is a machine learning algorithm that processes inputs and provides corresponding outputs by using multiple layers of processing units. A neural networks model is an example of a deep learning-based model. As used herein, "model" may also be referred to as "machine learning model", "learning model", "machine learning network", or "learning network", and these terms are used interchangeably herein.

"Neural networks" are a type of machine learning network based on deep learning. Neural networks are capable of processing inputs and providing corresponding outputs, typically comprising input and output layers and one or more hidden layers between the input and output layers. Neural networks used in deep learning applications typically comprise many hidden layers, thereby increasing the depth of the network. The layers of neural networks are sequentially connected so that the output of the previous layer is provided as input to the latter layer, where the input layer receives the input of the neural network and the output of the output layer serves as the final output of the neural network. Each layer of a neural network comprises one or more nodes (also known as processing nodes or neurons), each of which processes input from the previous layer.

Usually, machine learning can roughly comprise three stages, namely training stage, test stage, and application stage (also known as inference stage). During the training stage, a given model can be trained using a large scale of training data, iteratively updating parameter values until the model can obtain consistent inference from the training data that meets the expected objective. Through the training, the model can be considered to learn the correlation between input and output (also known as input-to-output mapping) from the training data. The parameter values of the trained model are determined. In the test stage, test inputs are applied to the trained model to test whether the model can provide correct outputs, thereby determining the performance of the model. In the application stage, the model can be used to process actual inputs and determine corresponding outputs based on the parameter values obtained from training.

FIG. 1 illustrates a schematic diagram of an example environment 100 in which embodiments of the present disclosure can be implemented. As shown in FIG. 1, the example environment 100 may include an electronic device 110.

In the example environment 100, the electronic device 110 may implement image segmentation through a trained image segmentation model 112. In some embodiments, after obtaining an target image 101, the electronic device 110 inputs the target image 101 into the image segmentation model 112 and the image segmentation model 112 may then output an image segmentation result 102 corresponding to the target image 101.

The target image 101 may be, for example, any image in any format (e.g., JPG format, PNG format, WEBP format, or the like), any size, any color (e.g., a color image, a black-and-white image, a grayscale image), etc. The image segmentation result 102 may be, for example, but is not limited to a segmentation map, a text sequence, an attention map, etc. associated with the target image 101.

The image segmentation model 112 may be, for example, any neural network that can perform image segmentation, including but not limited to a Fully Convolutional Network (FCN), a Convolutional Neural Network (CNN), a Recurrent Neural Network (RNN), or the like, but the embodiments of the present disclosure are not limited in this regard. In some embodiments, the image segmentation model 112 may be stored locally in the electronic device 110, and the electronic device 110 may directly use the local image segmentation model 112 to implement image segmentation when it needs to perform tasks associated with image segmentation. In some embodiments, the image segmentation model 112 may also be a model stored in the cloud. The electronic device 110 may transmit the target image 101 to the image segmentation model 112 in the cloud when it needs to perform tasks associated with image segmentation, and may obtain the image segmentation result 102 output by the image segmentation model 112 in the cloud.

The electronic device 110 may be any type of device with computing capability, including a terminal device or a server-side device. The terminal device may be any type of mobile terminal, fixed terminal or portable terminal, including a mobile phone, a desktop computer, a laptop computer, a notebook computer, a netbook computer, a tablet computer, a media computer, a multimedia tablet, a personal communication system (PCS) device, a personal navigation device, a personal digital assistant (PDA), an audio/video player, a digital camera/camcorder, a positioning device, a television receiver, a radio receiver, an e-book device, a gaming device, or any combination of the foregoing, including accessories and peripherals for these devices or any combination thereof. The server-side device may include, for example, a computing system/server, such as a mainframe, an edge computing node, a computing device in the cloud environment, and the like.

It would be appreciated that the structure and functionality of the environment 100 are described for exemplary purposes only, and do not imply any limitation on the scope of the present disclosure.

Traditional image segmentation schemes include, for example, methods based on lightweight supervised semantic segmentation. The lightweight supervised semantic segmentation uses sample data (such as sample image-text pairs) containing a small amount of labeled data or sample data without labeled data to implement the image segmentation function. Semantic segmentation is a basic task in computer vision, which aims to segment objects with different semantics in images, or to assign semantic classes to pixels of the corresponding objects.

FIGS. 2A to 2D illustrates schematic diagrams of lightweight supervised semantic segmentation schemes respectively. In FIGS. 2A to 2D, DB denotes a domain with segmentation labels, Do denotes a domain with open corpus information, and DT denotes a target domain.

Figure 2A:
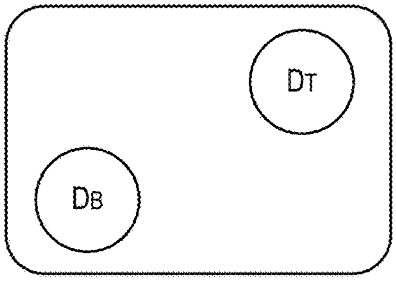
FIGS. 2A, 2B, 2C, and 2D illustrate schematic diagrams of lightweight supervised semantic segmentation schemes respectively.

FIG. 2A illustrates a schematic diagram of a lightweight supervised semantic segmentation scheme based on a Zero-Shot method. The Zero-Shot method is to train a image segmentation model using labeled samples on DB, and then perform a test on the target domain DT. Generally, the Zero-Shot method has poorer image segmentation performance as it is difficult for the model to generalize on completely unseen classes.

Figure 2B:
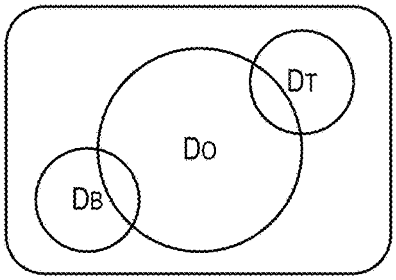

FIG. 2B illustrates a schematic diagram of a lightweight supervised semantic segmentation scheme based on an Open-Vocabulary method. The Open-Vocabulary method adds the domain Do with open corpus information on the basis of the Zero-Shot method. The corpus information in Do may assist the image segmentation model in a migration process from DB to DT, and compensate for more parameter differences.

Figure 2C:
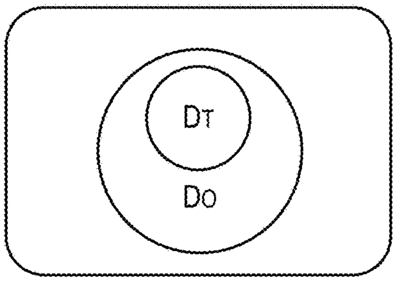
Figure 2D:
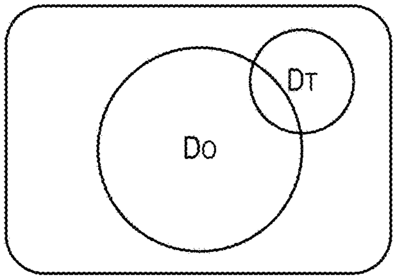
Figure 2E:
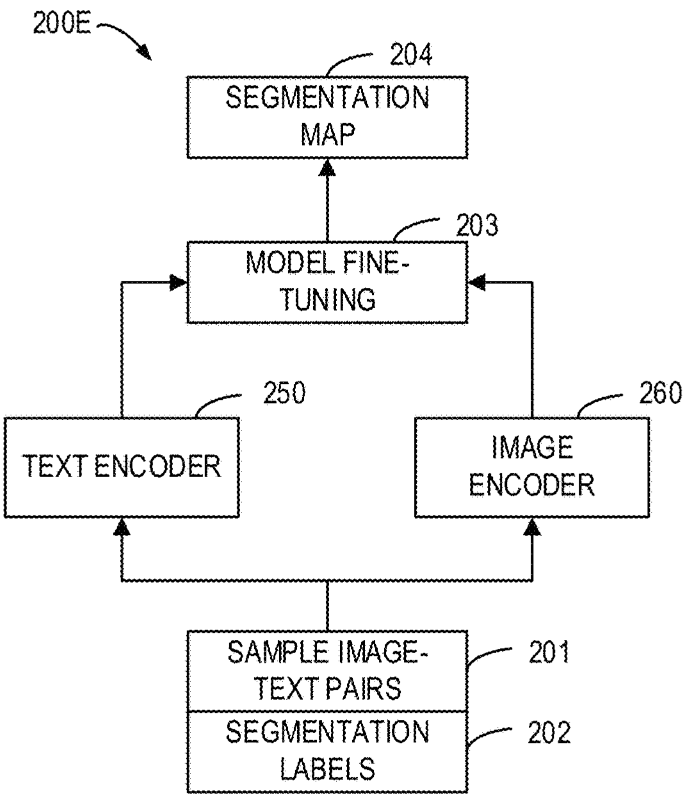
FIGS. 2E and 2F illustrate schematic diagrams of the training architecture of image segmentation models based on an Open-Vocabulary method respectively.
Figure 2F:
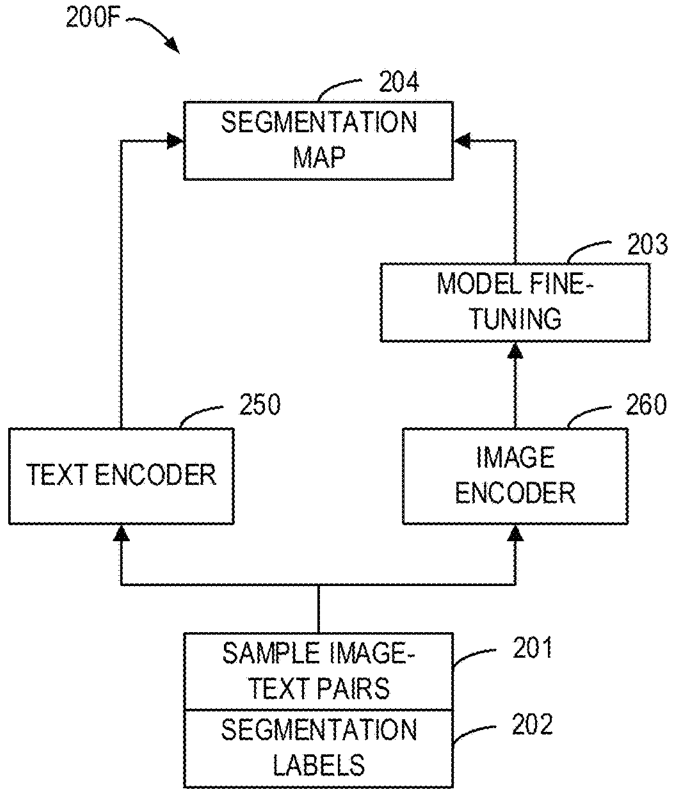

FIGS. 2E and 2F show schematic diagrams of the training architecture of an image segmentation model based on an Open-Vocabulary method respectively. In the architecture 200E of FIG. 2E, after the pre-training is completed, sample image-text pairs 201 and segmentation labels 202 are provided to a text encoder 250 and an image encoder 260 in a pre-trained image segmentation model. After the model fine-tuning 203 of the text encoder 250 and the image encoder 260, a segmentation map 204 corresponding to a sample image can be generated. In the architecture 200F of FIG. 2F, the sample image-text pairs 201 and the segmentation labels 202 are provided to the text encoder 250 and the image encoder 260 of the image segmentation model. The image encoder 260 experienced the model fine-tuning 203 and the text encoder 250 may generate the segmentation map 204 corresponding to the sample image. Therefore, the Open-Vocabulary method still require segmentation labels and additional model fine-tuning, which will result in less flexibility of the image segmentation model in different scenarios.

FIG. 2C illustrates a schematic diagram of a lightweight supervised semantic segmentation scheme based on a weakly-supervised method. The weakly-supervised method does not require segmentation labels, but require class labels of an image (the class labels of the image may be labels in DO). Generally, it can be considered that the class labels of the image completely cover the target domain DT. The image segmentation model may learn to segment corresponding objects from the image through the class labels of the image. However, the class labels are still required in the weakly-supervised method, and such labels often requires manual labelling on the classes of objects present in the image, which makes it difficult to expand the datasets for model training, thus resulting in poorer image segmentation performance.

FIG. 2D illustrates a schematic diagram of a lightweight supervised semantic segmentation scheme of a text-supervised method. The text-supervised method is based on image-text pair pre-training and does not require segmentation labels. Thus, image segmentation capability may be obtained by training the image segmentation model with zero samples.

Figure 2G:
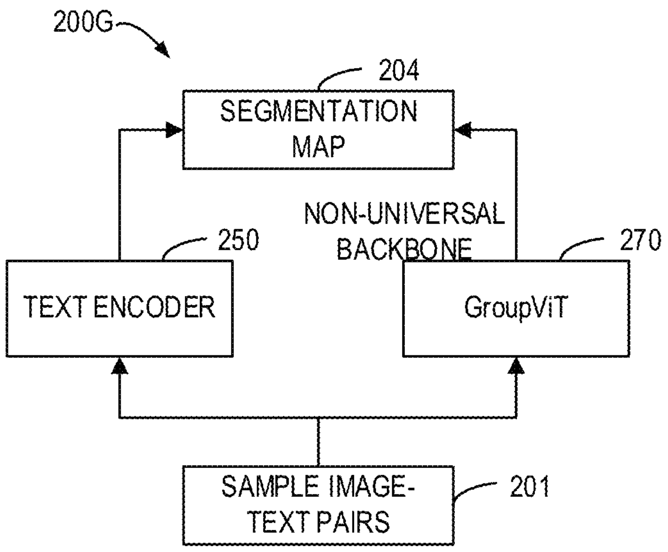
FIG. 2G illustrates a schematic diagram of the architecture of a GroupViT model based on a text-supervised method.

FIG. 2G illustrates a schematic diagram of the architecture of a GroupViT model based on a text-supervised method. As shown in FIG. 2G, in the architecture 200G, only sample image-text pairs 201 are provided to the text encoder 250 and a GroupViT 270, which can then output the segmentation map 204 corresponding to the sample image. Since the GroupViT model needs to implement image segmentation through its unique non-universal backbone network structure, the flexibility of the GroupViT model is poor. Since the GroupViT model does not support replacement with other backbone structures, the scalability of the GroupViT model is also not well.

As mentioned above, most image segmentation models need to use sample data containing labeled data for training. In semantic segmentation tasks, the labeled data should indicate the classes of individual pixels in each image. Since the labeled data requires high human cost and it is difficult to obtain the labeled data that contains all classes, the image segmentation performance of the trained image segmentation model is poor. Text-supervised semantic segmentation provides a new idea for this problem. The text-supervised semantic segmentation supports the model to be pre-trained using image/text pairs and migrated to semantic segmentation with zero samples. That is, an image-text cross-modal pre-training model may be caused to perform label-free image segmentation. However, traditional GroupViT models based on the text-supervised method have their unique non-universal backbone structures, which cannot implement image segmentation of unlabeled data through a universal image encoder, which makes the GroupViT models less flexible.

According to example embodiments of the present disclosure, there is provided an improved solution for image segmentation. According to the solution, a trained image encoder is used to extract an image feature representation of a target image, and a trained text encoder is used to generate text feature representations respectively corresponding to a plurality of classes. The image feature representation and the text feature representations are used to determine candidate segmentation maps for the plurality of classes corresponding to the target image and class confidences corresponding to the plurality of classes. The class confidences corresponding to the plurality of classes are used to determine at least one class related to the target image. The candidate segmentation map(s) and the class confidence(s) corresponding to the at least one class are used to determine a target segmentation map of the target image. In this way, the image segmentation function can be achieved by using the image encoder and text encoder with feature extraction function and without requiring labeled data for image segmentation. This can facilitate flexible application of the models and ensure the efficiency and accuracy of image segmentation.

Some example embodiments of the present disclosure will be described below with reference to the accompanying drawings.

Figure 3:
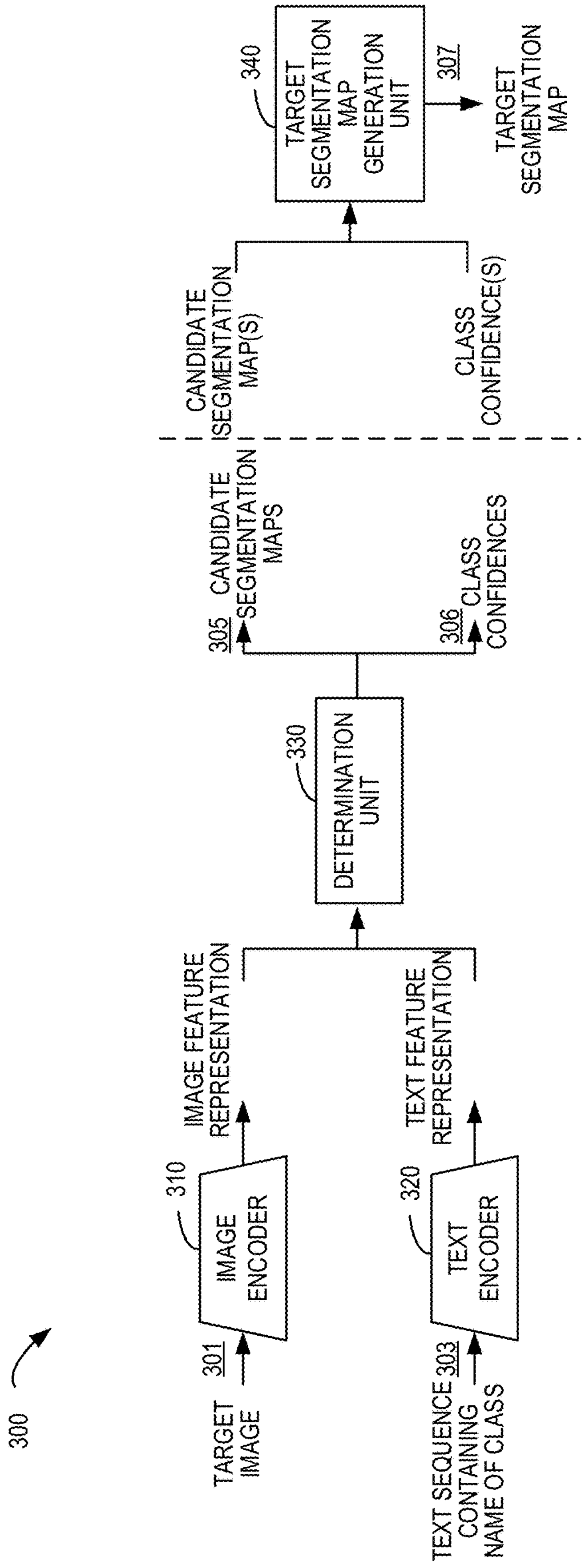
FIG. 3 illustrates a schematic diagram of an architecture for image segmentation in accordance with some embodiments of the present disclosure.

FIG. 3 illustrates a schematic diagram of an architecture 300 for image segmentation in accordance with some embodiments of the present disclosure. The architecture 300 may be implemented at the electronic device 110 of FIG. 1, and an image encoder 310 and/or a text encoder 320 in the architecture 300 may be implemented by or using the image segmentation model 112 of FIG. 1. For ease of discussion, the architecture 300 will be described with reference to the environment 100 of FIG. 1.

As shown in FIG. 3, the architecture 300 includes the image encoder 310, the text encoder 320, a determination unit 330, and a target segmentation map generation unit 340. In some embodiments, the image encoder 310 may be constructed as a machine learning model or neural network suitable for processing visual data. The text encoder 320 may be constructed as a machine learning model or neural network suitable for processing text data. In some embodiments, the image encoder 310 and/or the text encoder 320 may be implemented based on one or more Transformer blocks or various variants thereof respectively. In addition to the Transformer blocks, one or more of the image encoder 310 and/or the text encoder 320 may be based on other types of models or neural networks, such as a Unet architecture, a SegNet architecture, a Fully Convolutional Network (FCN), a Convolutional Neural Network (CNN), a Recurrent Neural Network (RNN), etc. A specific type of model structure may be selected according to actual application requirements, and there are no limitations here.

The image encoder 310 is configured to extract an image feature representation 302 of a target image 301. The feature representation may often be in the form of a multidimensional vector. Herein, "feature representation" (referred to as "feature" for short) is sometimes also called an encoded representation, a vector representation, etc. In some embodiments, the image feature representation 302 may characterize the colors, textures, object profiles, and/or other attributes of the image.

In some embodiments, the image encoder 310 may be an image encoder based on a CNN structure, which can output the corresponding image feature representation 302 directly based on the input target image 301.

As an alternative, the image encoder 310 may extract multiple image features for the target image 301, and obtain the image feature representation 302 by aggregating the extracted image features. In some embodiments, the image encoder 310 may be an image encoder based on a transformer structure, which may extract token-wise image features of the target image 301, where each token corresponds to an image block, and the image feature representation 302 may be obtained by aggregating the image features token-by-token. The above example embodiments are described in detail below with reference to FIG. 4, which illustrates an architecture 400 for image segmentation according to an embodiment of the present disclosure.

Figure 4:
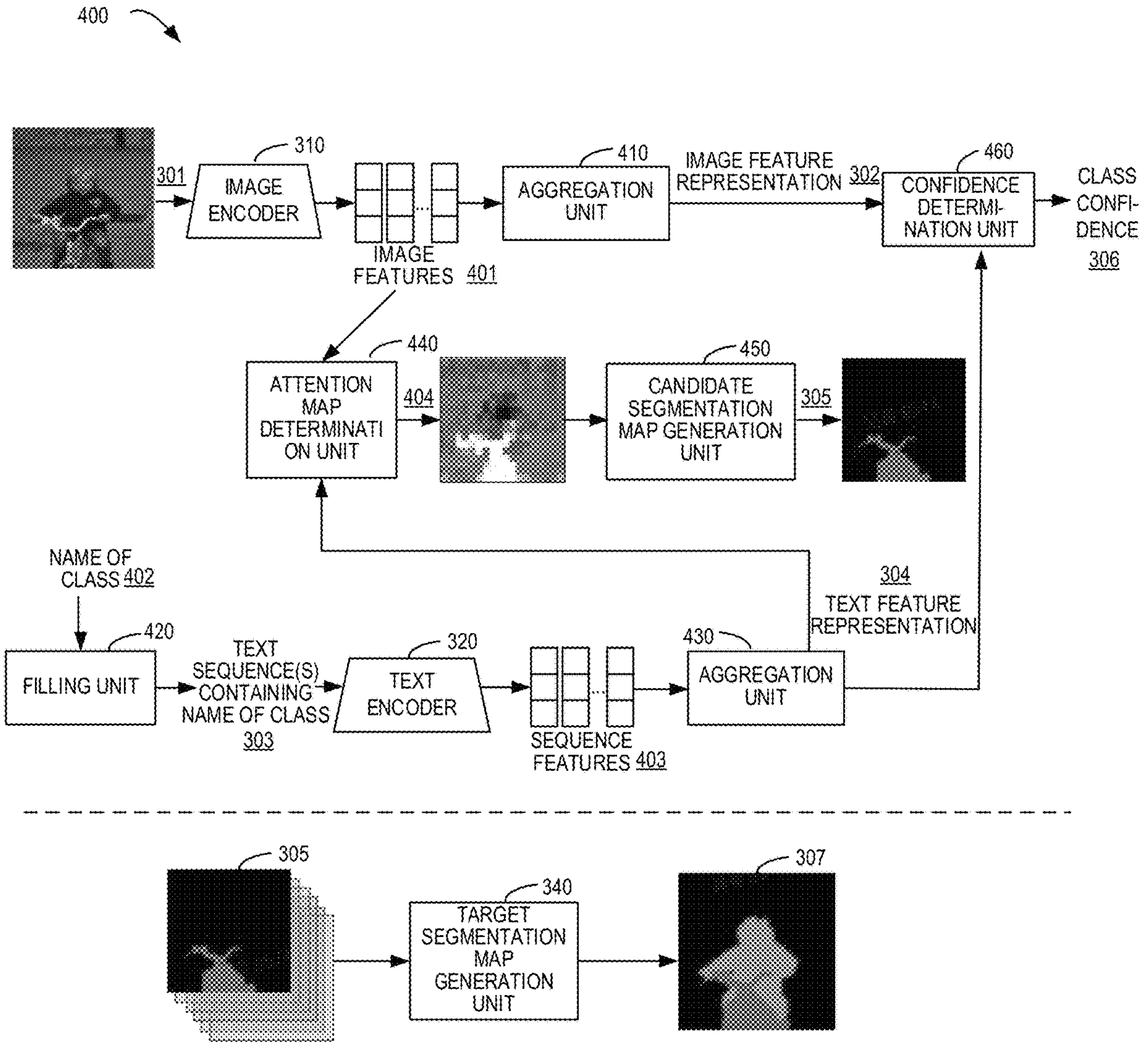
FIG. 4 illustrates a schematic diagram of an architecture for image segmentation in accordance with some embodiments of the present disclosure.

As shown in FIG. 4, an image encoder 310 may extract a plurality of image features 401 for a plurality of image blocks of an input target image 301. For example, if the size of the target image 301 is L×L (that is, the target image 301 contains L×L image blocks), the image encoder 310 based on the transformer structure may output corresponding L×L image features based on the target image 301.

The plurality of image features 401 are provided to an aggregation unit 410, and the aggregation unit 410 may aggregate the plurality of image features 401 to obtain the image feature representation 302 of the target image 301. The aggregation unit 410 may use an aggregation function to aggregate the plurality of image features 401. The aggregation function may be, for example, an average aggregate function (AVG), a maximum aggregate function (MAX), a minimum aggregate function (MIN), a summation aggregate function (SUM), or the like. In some embodiments, the average aggregation function, which is more commonly used, may be applied.

Since an image often contains a large number of background elements, an aggregation result obtained by directly aggregating the image features will be dominated by the background elements. In order to improve the sensitivity of the model to foreground objects, that is, to improve the accuracy of image segmentation results, in some embodiments, the aggregation unit 410 may also arrange the plurality of image features 401 that have been obtained in a descending order of values in the spatial dimension. The aggregation unit 410 may aggregate only a plurality of top-ranked image features 401 to obtain the image feature representation 302.

Reference is made back to FIG. 3. The text encoder 320 is configured to generate a text feature representation 304 corresponding to the name of class. Here, the class is related to the target image 301. In some embodiments, a class set associated with the target image 301 may be obtained in advance, and this set may include all classes associated with the target image 301.

In some embodiments, for each class in the class set, the text encoder 320 may obtain a text sequence 303 containing the "name of class" and generate a corresponding text feature representation 304 based on the text sequence 303 containing the "name of class". The class may be, for example, the class of object included in the target image 301, and the text sequence 303 containing the "name of class"

may be, for example, a text sequence containing the "name of class" such as "bicycle", "animal", "shoes", and so on. However, the embodiments of the present disclosure are not limited in this regard.

Considering the generation of the text sequence 303 containing the "name of class", in some embodiments, the name of class may be expanded into the text sequence 303 containing the "name of class".

As shown in FIG. 4, at least one name of class 402 is provided to a filling unit 420 which may generate at least one text sequence 303 containing the "name of class" by filling the name of class 402 into at least one prompt template respectively. Specifically, for each class, the filling unit 420 may fill the name of class 402 into the at least one prompt template through prompt engineering, to obtain the at least one text sequence 303 containing the "name of class". The prompt engineering may include, for example, Zero-shot Prompting, Few-shot Prompting, Chain-of-Thought Prompting (CoT), Zero-shot CoT, Self-Consistency, Generate Knowledge Prompting, and Automatic Prompt Engineer (APE), and the like, but the embodiments of the present disclosure are not limited in this regard.

For example, by taking the name of class 402 being "bicycle" as an example, the filling unit 420 may fill the "bicycle" into the at least one prompt template to obtain a plurality of text sequences. The plurality of text sequences may be, for example, "a picture of bicycle", "an oil painting of bicycle", "one bicycle", and the like. In some embodiments, the at least one prompt template includes a plurality of different prompt templates. Therefore, the at least one text sequence 303 containing the "name of class" may include a plurality of different text sequences, each text sequence containing the name of class. In this way, it can achieve diversified language expressions of class names by using different prompt templates to generate different text sequences, which can improve the accuracy of subsequently extracting the features by the text encoder 320.

Reference is made back to FIG. 3. The text feature representation 304 may characterize the number, order, and/or other attributes of words in the text. In some embodiments, to ensure that the image feature representation 302 and the text feature representation 304 can be directly processed by the determination unit 330 subsequently, the image feature representation 302 and the text feature representation 304 have the same dimensionality. For example, if the image feature representation 302 is 1024-dimensional, the text feature representation 304 is also 1024-dimensional.

Regarding the specific extraction method of the text feature representation 304, similarly to the image feature representation 302, the text encoder 320 may directly extract the text feature representation 304 of the text sequence. The text encoder 320 may also be configured to extract a plurality of sequence features of the text sequence. The text feature representation 304 may be obtained by aggregating the plurality of sequence features output by the text encoder 320. For example, the text encoder 320 based on the transformer structure may extract token-by-token text features of the text sequence, each token corresponding to one word. The text feature representation 304 may be obtained by aggregating the text features token-by-token.

As shown in FIG. 4, the text encoder 320 may respectively extract at least one sequence feature 403 for the at least one text sequence 303 containing the "name of class". Specifically, a plurality of text units (e.g., each containing a single word or words) in the text sequence 303 containing the "name of class" can be tokenized and converted into an embedding vector representation. For example, a vocabulary may be defined that includes T text units. In this way, each word in the vocabulary may be converted into a T-dimensional one-hot vector (that is, only one position in T dimensions is 1, and the rest are Os). However, a language model (e.g., which may be a fully connected (FC) network) may be learned to map the T-dimensional one-hot vector to a smaller D-dimensional vector (V>>D). As such, each text unit may be uniquely mapped to a D-dimensional vector. By performing the mapping on each text unit in the text sequence, the text sequence 303 containing the "name of class" may be mapped into a feature sequence.

The feature sequence corresponding to the text sequence 303 containing the "name of class" is input to the text encoder 320 for feature extraction, and thus at least one sequence feature 403 is obtained. The number of the at least one sequence feature 403 is the number of text units in the text sequences 303 containing the "name of class". For example, if each class has T prompts, the text sequences 303 containing the "name of class" may be mapped into the feature sequences. The text encoder 320 based on the transformer structure may be based on the feature sequences corresponding to the text sequences 303 containing the "name of class", and output corresponding Ttext features (i.e. the sequence features 403).

The at least one sequence feature 403 is provided to the aggregation unit 430, and the aggregation unit 430 may aggregate the at least one sequence feature 403 to obtain the text feature representation 304 of the class. Similarly to the aggregation unit 410, the aggregation unit 430 may apply an aggregation function to aggregate the at least one sequence feature 403. In some embodiments, the aggregation unit 430 may also arrange the at least one sequence feature 403 that has been obtained in a descending order of values in the spatial dimension. The aggregation unit 430 may aggregate only at least one top-ranked sequence feature 403 to obtain the text feature representation 304 of the class.

It would be appreciated that although two aggregation units (aggregation unit 410 and aggregation unit 430) are shown in FIG. 4 to aggregate the image features or the sequence features respectively, in some embodiments, it is also feasible that only one aggregation unit is included to aggregate the input features, and the embodiments of the present disclosure are not limited in this regard.

Reference is made back to FIG. 3. The image feature representation 302 is provided to the determination unit 330 together with the text feature representation 304. For each class in the class set, the determining unit 330 is configured to determine a candidate segmentation map 305 for the target image 301 and a class confidence 306 corresponding to the class, based on the image feature representation 302 and the text feature representation 304 corresponding to the class. The candidate segmentation map indicates whether respective pixels in the target image are classified into that class. In some embodiments, the determination unit 330 may be implemented based on one or more Transformer blocks or various variants thereof. In addition to the Transformer blocks, the determination unit 330 may be based on other types of models or neural networks, such as a SENet architecture, a Residual Attention Network (RAN), a BAM architecture, a CBAM architecture, etc. A specific type of model structure may be selected according to actual application requirements.

Regarding the specific determination method of the candidate segmentation map 305, in some embodiments, the determination unit 330 may directly obtain the candidate segmentation map 305 for the target image 301 based on the image feature representation 302 and the text feature representation 304 corresponding to the class. In some embodiments, after obtaining the image feature representation 302 and the text feature representation 304 corresponding to the class, the determination unit 330 may determine an attention map based on both of the feature representations. The attention map indicates a plurality of correlations between the class and a plurality of image blocks in the target image 301. The determination unit 330 may generate the candidate segmentation map 305 by processing the attention map.

In the example where the determination unit 330 includes one or more Transformer blocks, the determination unit 330 may define the text feature representation 304 as a query feature input to each Transformer block, and may define the image feature representation 302 as a key feature and a value feature input to each Transformer block. The processing of a Transformer block may be represented as follows:

$$\text{Attention}(Q, K, V) = \text{softmax}\left(\frac{QK^T}{\sqrt{d_k}}\right)V \tag{1}$$

where Q represents a query feature, K represents a key feature, V represents a value feature, and $d_k$ represents the number of columns of Q and K, that is, the feature dimension. The above processing may be interpreted as using the query feature Q and the key feature K to calculate a self-attention weight matrix. The function of Softmax is to normalize the matrix to obtain a normalized self-attention weight matrix, and the normalized self-attention weight matrix is used to perform weighted adding on the value feature V to obtain an attention weight Attention.

The determining unit 330 may calculate self-attention weights, determine the attention map based on the self-attention weights, and generate the candidate segmentation map 305 by processing the attention map.

In some embodiments, in the case where the image encoder 310 is configured to extract a plurality of image features for a plurality of image blocks of the target image 301, the determining unit 330 may also be configured to determine the attention map based on the text feature representation 304 and the plurality of image features. Such example embodiments are described below with continued reference to FIG. 4.

As shown in FIG. 4, the determining unit 330 may include an attention map determining unit 440 and a candidate segmentation map generating unit 450, both of which are configured to perform a subtask of determining the attention map and a subtask of generating the candidate segmentation map 305 respectively. In some embodiments, the image features 401 and the text feature representation 304 corresponding to the class are provided to the attention map determination unit 440, and the attention map determination unit 440 is configured to determine an attention map 404 based on the text feature representation 304 and the plurality of image features 401.

Specifically, in an example where the plurality of image features 401 are L×L image features, the attention map determination unit 440 may perform calculation on the text feature representation 304 and the L×L image features to obtain the attention map 404. Specific calculation methods may include, for example, performing an inner product or other appropriate aggregation operation on the text feature representation 304 and the L×L image features respectively. As an example, the attention map determination unit 440 may perform the inner product operation on the text feature representation 304 and the L×L image features, to obtain the attention map 404 with a size of L×L.

Further, the attention map 404 is provided to the candidate segmentation map generation unit 450, and the candidate segmentation map generation unit 450 may generate the candidate segmentation map 305 by processing the attention map 404. Specifically, the candidate segmentation map generation unit 450 may upsample the attention map 404 to a size corresponding to the target image 301 to obtain an upsampled attention map 404. Upsampling may be achieved through specific methods, such as but not limited to bilinear interpolation, transpose convolution, upsampling, up-pooling, subpixel convolution, and the like.

The image resolution of the upsampled attention map 404 is the same as that of the target image 301. The candidate segmentation map generation unit 450 may then generate the candidate segmentation map 305 by applying a Conditional Random Field (CRF) process to the upsampled attention map 404. The CRF may include, for example, a fully connected conditional random field (DenseCRF), a linear chain conditional random field (linear-CRF), a Gaussian conditional random field (G-CRF), a Markov random field (MRF) and so on. The candidate segmentation map generation unit 450 may optimize the attention map 404 through the CRF, determine the class corresponding to each pixel in the image, and then output the candidate segmentation map 305. In some embodiments, the candidate segmentation map 305 for a single class may be a 0-1 binary distribution map. In the 0-1 binary distribution map, 0 may indicate that the pixel there does not conform to this class, and 1 may indicate that the pixel there does not conform to this class. It would be appreciated that the above meanings represented by 0 and 1 are merely exemplary. In other embodiments according to the present disclosure, 1 may also be used to indicate that the pixel there does not conform to this class, and 0 may be used to indicate that the pixel there does conform to this class.

In some embodiments, the determination unit 330 may also include a confidence determination unit 460 configured to perform a subtask of determining a class confidence 306 for a class. Specifically, the confidence determination unit 460 may perform calculation on the image feature representation 302 and the text feature representation 304 corresponding to the class, and the calculated result may indicate the class confidence 306 for the class. Specific calculation methods may include, for example, performing an inner product or other appropriate aggregation operation on the image feature representation 302 and the text feature representation 304 corresponding to the class. For example, the confidence determination unit 460 may perform the inner product operation on the image feature representation 302 and the text feature representation 304 corresponding to the class, to obtain the class confidence 306 corresponding to the class.

With continued reference to FIG. 3. The candidate segmentation maps 305 and the class confidences 306 corresponding to a plurality of classes are provided to the target segmentation map generation unit 340. The target segmentation map generation unit 340 is configured to select at least one class related to the target image 301 from the plurality of classes based on the plurality of class confidences 306 respectively determined for the plurality of classes. The target segmentation map generation unit 340 is further configured to determine a target segmentation map 307 for the target image 301 based on the candidate segmentation map(s) 305 and the class confidence(s) 306 determined for the at least one selected class, the target segmentation map 307 indicating whether respective pixels in the target image 301 are classified into a class amongst the at least one class.

In some embodiments, the target segmentation map generation unit 340 may select a first number of classes from the plurality of classes based on the plurality of class confidences 306 respectively determined for the plurality of classes. Specifically, the target segmentation map generation unit 340 may rank the plurality of class confidences 306, for example, in a descending order. The target segmentation map generation unit 340 then selects the classes corresponding to the first number of class confidences 306 that are top-ranked from the plurality of class confidences 306. For example, if a total of N classes are included, the target segmentation map generation unit 340 may select the first M classes in order from the N classes, where M may be, for example, N/2. In this way, the target segmentation map generation unit 340 may filter out the low-ranked (N-M) classes. In this way, the noise interference in image segmentation may be reduced as the low-ranked (N-M) classes often contain a lot of noise. This can improve the accuracy of the target segmentation map that is generated subsequently and improve the effect of image segmentation.

Further, the target segmentation map generation unit 340 may determine a threshold confidence based on the first number of class confidences 306 respectively corresponding to the first number of classes. Specifically, the target segmentation map generation unit 340 may perform calculation on the first number of class confidences 306, and the calculation result is the threshold confidence. Specific calculation method may include, for example, performing summing, averaging, standard deviation, variance, or the like on the first number of class confidences 306, and may also include any combination of the foregoing. In some embodiments, the target segmentation map generation unit 340 may determine the threshold confidence based on a mean ( ) and standard deviation (a) of the first number of class confidences 306. As an example, the threshold confidence can be determined as the sum of the mean and standard deviation (+a).

The target segmentation map generation unit 340 may select at least one class whose corresponding class confidence 306 exceeds the threshold confidence from the first number of classes. For example, the target segmentation map generation unit 340 may select at least one class whose corresponding class confidence 306 exceeds the threshold confidence (e.g., +a) from the M classes.

In some embodiments, the at least one class selected by the target segmentation map generation unit 340 includes at least two classes. The target segmentation map generation unit 340 may determine, for each pixel in the target image 301, that the pixel is classified into a target class amongst the at least two classes, based on at least two class confidences 306 corresponding to the at least two classes. Specifically, the target segmentation map generation unit 340 may stack at least two candidate segmentation maps 305 corresponding to the selected at least two classes, and perform an Argmax operation on each pixel to select out the class of the greatest confidence corresponding to each pixel, thus obtaining the target segmentation map 307. The Argmax operation is to stack the at least two candidate segmentation maps 305 and multiply their respective class confidences 306 simultaneously. The result with the largest value is the class confidence corresponding to the target class corresponding to each pixel. Therefore, the target segmentation map generation unit 340 may determine the target segmentation map 307 for the target image 301 based on the plurality of candidate segmentation maps 305 and the plurality of class confidences 306 respectively corresponding to the plurality of classes.

According to the above scheme, in the case that the candidate segmentation map 305 determined for a single class is a 0-1 binary segmentation map, the target segmentation map 307 finally generated by the target segmentation map generation unit 340 may still be a multi-valued segmentation map. For example, if 0-1 binary segmentation maps of three classes are finally selected for stacking, then value 0 may be used to indicate a first class, value 1 to indicate a second class, and value 3 to indicate a third class in the target segmentation map 307. In some embodiments, the target segmentation map 307 may also contain a value of 4, which may indicate the background of the image. It would be appreciated that the above numerical values 0-4 and their indicated meanings are merely exemplary, and in other embodiments according to the present disclosure, different classes may also be represented by other numerical values.

It should also be understood that the images, features, sequences, correlation diagrams, and so on given in FIGS. 3 and 4 are for the purpose of explanation, and do not have any limitations on the embodiments of the present disclosure.

An example of image segmentation using the trained text encoder and image encoder is described above in conjunction with FIGS. 3 and 4. The following will continue to introduce specific training examples of the text encoder and image encoder.

In some embodiments, the text encoder 320 and the image encoder 310 may be pre-trained to allow them to learn the relationship between text sequences and images, which helps to ensure the accuracy of subsequently using the trained text encoder and image encoder to extract the text feature representation as well as the image feature representation. In some embodiments, in order to ensure the flexibility of the text encoder and image encoder in various image processing scenarios, the image encoder and text encoder are trained based on unlabeled training data, the training data including a large number of sample image-text pairs. Based on the unlabeled training data, the image encoder and text encoder may learn how to extract features of image modality data and text modality data based on contrastive learning.

The sample images in the training data are provided to the image encoder, and the image encoder determines their corresponding sample image feature representations based on the sample images. The sample text sequences in the training data are provided to the text encoder, and the text encoder may determine their corresponding sample text feature representations based on the sample text sequences.

In some embodiments, the sample image feature representations and the sample text feature representations may be directly output by the image encoder and text encoder, or they may be obtained through other processing. For example, if the image encoder and text encoder are both based on the transformer structure, the image encoder may output corresponding image features based on the input sample image, and the sample image feature representations may be obtained by aggregating the image features. The text encoder may output corresponding sequence features based on the input sample text sequences, and the sample text feature representations may be obtained by aggregating the sequence features.

Further, the calculation of a loss function can be performed for all sample data, and the parameters of the image encoder and text encoder may be adjusted based on calculation results of the loss function. The loss function may be, for example, a L2 loss function, a L1 loss function, a Smooth L1 loss function, a huber loss function, a softmax loss function, and the like. In some embodiments, a contrastive learning loss (InfoNCE) between the sample image feature representations and the sample text feature representations may be calculated. The learning goal of the image encoder and text encoder is to increase the similarity of positive sample pairs and reduce the similarity of negative sample pairs.

Figure 5:
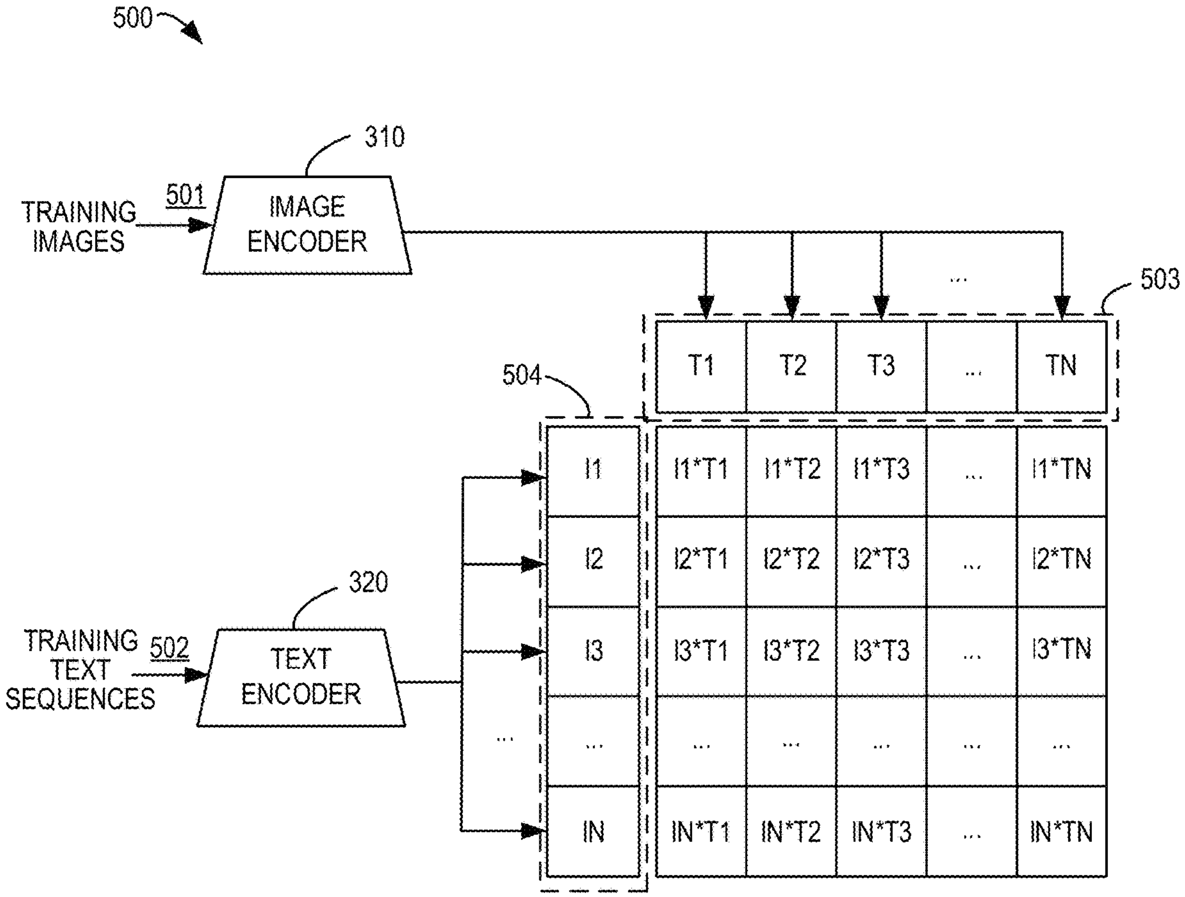
FIG. 5 illustrates a schematic diagram of model pre-training in accordance with some embodiments of the present disclosure.

By taking the image encoder and text encoder being the image encoder and text encoder in the CLIP model as an example, the training data may be directly input into the model, and the model may perform updating the parameters of the image encoder and text encoder based on the calculation results of the loss function. FIG. 5 illustrates a schematic diagram of model pre-training in accordance with some embodiments of the present disclosure.

As shown in FIG. 5, for training data with N sample image-text pairs, the image encoder 310 may generate N image feature representations 503 based on training images 501, and the text encoder 320 may generate N text feature representations 504 based on training text sequences 502. The model may combine the N image feature representations 503 and the N text feature representations 504 in pairs to predict the similarity of $N^2$ possible sample image-text pairs. The similarity here directly calculates a cosine similarity between the text features and the image features, which is the matrix shown in FIG. 5. There are a total of N positive samples here, i.e. text and image that really are classified into a pair (diagonal elements in the matrix), while the remaining $N^2-N$ sample image-text pairs are negative samples.

In summary, the pre-trained image encoder and text encoder can be leveraged for feature extraction in image segmentation. In this way, the image segmentation may be implemented using the image encoder and text encoder with feature extraction function, without requiring labeled data for image segmentation. This can facilitate flexible application of the models and ensure the efficiency and accuracy of image segmentation.

Figure 6:
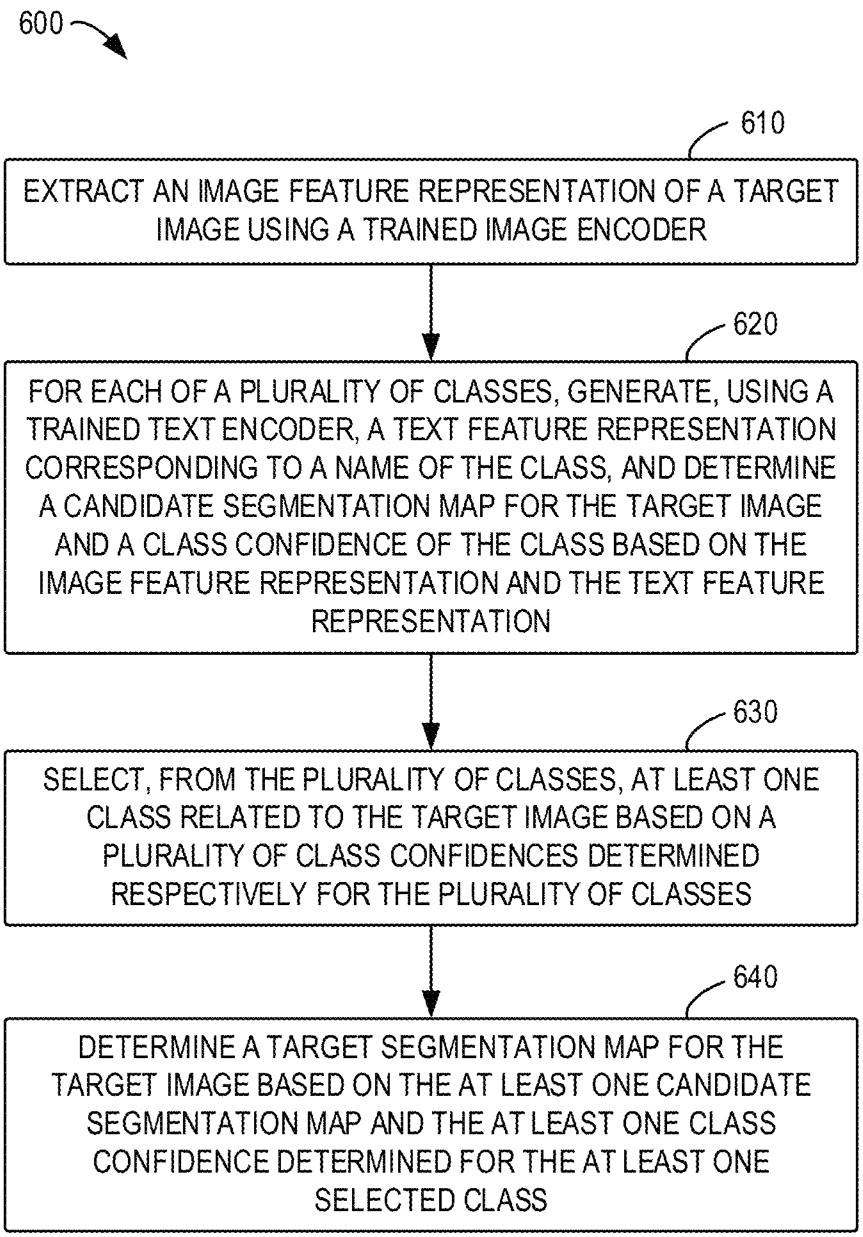
FIG. 6 illustrates a flowchart of a process for image segmentation in accordance with some embodiments of the present disclosure.

FIG. 6 illustrates a flowchart of a process 600 for image segmentation in accordance with some embodiments of the present disclosure. The process 600 may be, for example, implemented at the electronic device 110. For the purpose of discussion, the process 600 will be described with reference to the environment 100 of FIG. 1.

At block 610, the electronic device 110 extracts an image feature representation of a target image using a trained image encoder.

At block 620, for each of a plurality of classes, the electronic device 110 generates, using a trained text encoder, a text feature representation corresponding to a name of the class, and determines a candidate segmentation map for the target image and a class confidence of the class based on the image feature representation and the text feature representation, the candidate segmentation map indicating whether respective pixels in the target image are classified into the class.

In some embodiments, generating the text feature representation for each of the plurality of classes comprises: generating at least one text sequence containing the name of the class; extracting, using the text encoder, at least one sequence feature of the at least one text sequence respectively; and generating the text feature representation by aggregating the at least one sequence feature.

In some embodiments, the at least one text sequence comprises a plurality of different text sequences with each text sequence containing the name of the class.

In some embodiments, generating the at least one text sequence comprises: generating the at least one text sequence by filling the name of the class into at least one prompt template, respectively.

In some embodiments, determining the candidate segmentation map for each of the plurality of classes comprises: determining an attention map based on the text feature representation and the image feature representation, the attention map indicating a plurality of correlations between the class and a plurality of image blocks in the target image; and generating the candidate segmentation map by processing the attention map.

In some embodiments, generating the candidate segmentation map by processing the attention map comprises: upsampling the attention map to a size corresponding to the target image, to obtain an upsampled attention map; and generating the candidate segmentation map by applying a conditional random field (CRF) process to the upsampled attention map.

In some embodiments, extracting the image feature representation comprises: extracting a plurality of image features for the plurality of image blocks of the target image using the image encoder; and determining the image feature representation by aggregating the plurality of image features, and wherein determining the attention map comprises: determining the attention map based on the text feature representation and the plurality of image features.

In some embodiments, the image encoder and the text encoder are trained based on unlabeled training data, the training data comprising sample image-text pairs.

At block 630, the electronic device 110 selects, from the plurality of classes, at least one class related to the target image based on a plurality of class confidences determined respectively for the plurality of classes.

In some embodiments, selecting at least one class comprises: selecting a first number of classes from the plurality of classes based on the plurality of class confidences determined respectively for the plurality of classes; determining a threshold confidence based on the first number of class confidences corresponding to the first number of classes respectively; and selecting, from the first number of classes, the at least one class with a corresponding class confidence exceeding the threshold confidence.

In some embodiments, determining the threshold confidence comprises: determining the threshold confidence based on a mean and standard deviation of the first number of class confidences.

At block 640, the electronic device 110 determines a target segmentation map for the target image based on the at least one candidate segmentation map and the at least one class confidence determined for the at least one selected class, the target segmentation map indicating whether respective pixels in the target image are classified into a class amongst the at least one class.

In some embodiments, the at least one selected class comprises at least two classes, and wherein determining the target segmentation map comprises: for each pixel in the target image, determining that the pixel is classified into a target class amongst the at least two classes based on at least two class confidences corresponding to the at least two classes.

Figure 7:
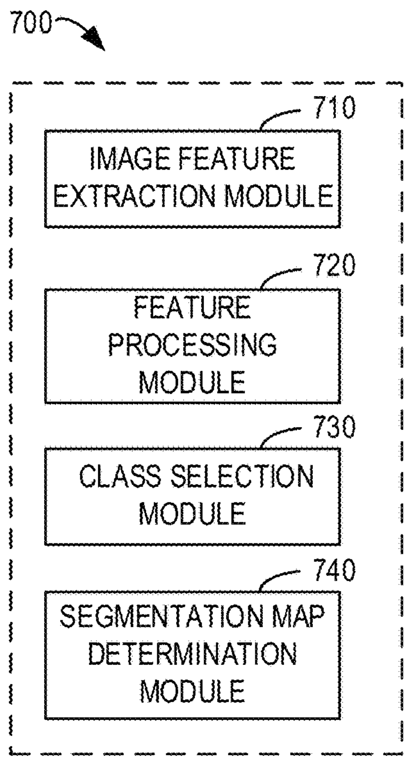
FIG. 7 illustrates a schematic structural block diagram of an apparatus for image segmentation in accordance with some embodiments of the present disclosure.

FIG. 7 illustrates a schematic structural block diagram of an apparatus 700 for image segmentation in accordance with some embodiments of the present disclosure. The apparatus 700 may be implemented as or included in the electronic device 110. The respective modules/components of the apparatus 700 may be implemented in hardware, software, firmware, or any combination thereof.

As shown, the apparatus 700 includes an image feature extraction module 710 configured to extract an image feature representation of a target image using a trained image encoder. The apparatus 700 also includes a feature processing module 720 configured to, for each of a plurality of classes, generate, using a trained text encoder, a text feature representation corresponding to a name of the class, and determine a candidate segmentation map for the target image and a class confidence of the class based on the image feature representation and the text feature representation, the candidate segmentation map indicating whether respective pixels in the target image are classified into the class. The apparatus 700 further includes a class selection module 730 configured to select, from the plurality of classes, at least one class related to the target image based on a plurality of class confidences determined respectively for the plurality of classes. The apparatus 700 further includes a segmentation map determination module 740 configured to determine a target segmentation map for the target image based on the at least one candidate segmentation map and the at least one class confidence determined for the at least one selected class, the target segmentation map indicating whether respective pixels in the target image are classified into a class amongst the at least one class.

In some embodiments, the feature processing module 720 comprises: a text sequence generation module configured to generate at least one text sequence containing the name of the class; a sequence feature extraction module configured to extract, using the text encoder, at least one sequence feature of the at least one text sequence respectively; and a text feature generation module configured to generate the text feature representation by aggregating the at least one sequence feature.

In some embodiments, the at least one text sequence comprises a plurality of different text sequences with each text sequence containing the name of the class.

In some embodiments, the text sequence generation module is further configured to: generate the at least one text sequence by filling the name of the class into at least one prompt template, respectively.

In some embodiments, the segmentation map determination module 740 comprises: an attention map determination module configured to determine an attention map based on the text feature representation and the image feature representation, the attention map indicating a plurality of correlations between the class and a plurality of image blocks in the target image; and a segmentation map generation module configured to generate the candidate segmentation map by processing the attention map.

In some embodiments, the segmentation map generation module is further configured to: upsample the attention map to a size corresponding to the target image to obtain an upsampled attention map; and generate the candidate segmentation map by applying a conditional random field (CRF) process to the upsampled attention map.

In some embodiments, the image feature extraction module 710 is further configured to: extract a plurality of image features for the plurality of image blocks of the target image using the image encoder; and determine the image feature representation by aggregating the plurality of image features. In these embodiments, the attention map determination module is further configured to: determine the attention map based on the text feature representation and the plurality of image features.

In some embodiments, the class selection module 730 is further configured to: select a first number of classes from the plurality of classes based on the plurality of class confidences determined respectively for the plurality of classes; determine a threshold confidence based on the first number of class confidences corresponding to the first number of classes respectively; and select, from the first number of classes, the at least one class with a corresponding class confidence exceeding the threshold confidence.

In some embodiments, the class selection module 730 is further configured to: determine the threshold confidence based on a mean and standard deviation of the first number of class confidences.

In some embodiments, the at least one selected class comprises at least two classes, and the segmentation map determination module 740 is further configured to: for each pixel in the target image, determine that the pixel is classified into a target class amongst the at least two classes based on at least two class confidences corresponding to the at least two classes.

In some embodiments, the image encoder and the text encoder are trained based on unlabeled training data, the training data comprising sample image-text pairs.

Figure 8:
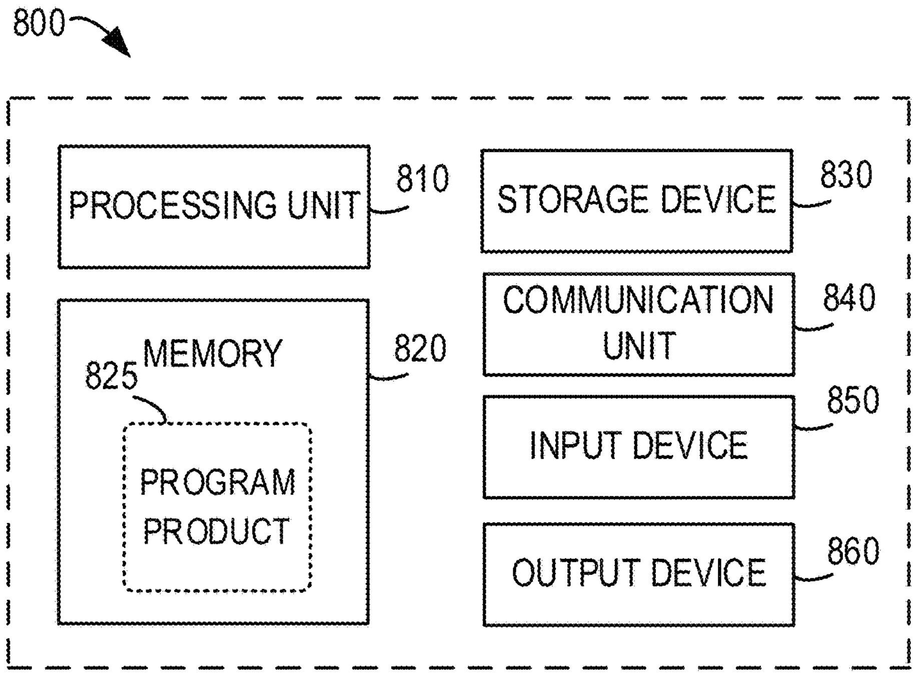
FIG. 8 illustrates a block diagram of an electronic device that may implement one or more embodiments of the present disclosure.

FIG. 8 illustrates a block diagram of an electronic device 800 may be one or more embodiments of the present disclosure. It would be appreciated that the electronic device 800 shown in FIG. 8 is merely exemplary and should not constitute any limitation on the functionality and scope of the embodiments described herein. The electronic device 1100 may be used, for example, to implement the electronic device 110 of FIG. 1.

As shown in FIG. 8, the electronic device 800 is in the form of a general computing device. The components of the electronic device 800 may include, but are not limited to, one or more processors or processing units 810, a memory 820, a storage device 830, one or more communication units 840, one or more input devices 850, and one or more output devices 860. The processing unit 810 may be an actual or virtual processor and can execute various processes according to the programs stored in the memory 820. In a multi-processor system, multiple processing units execute computer executable instructions in parallel to improve the parallel processing capability of the electronic device 800.

The electronic device 800 typically includes a variety of computer storage medium. Such medium may be any available medium that is accessible to the electronic device 800, including but not limited to volatile and non-volatile medium, removable and non-removable medium. The memory 820 may be volatile memory (for example, a register, cache, a random access memory (RAM)), a non-volatile memory (for example, a read-only memory (ROM), an electrically erasable programmable read-only memory (EEPROM), a flash memory) or any combination thereof. The storage device 830 may be any removable or non-removable medium, and may include a machine-readable medium, such as a flash drive, a disk, or any other medium, which can be used to store information and/or data (such as training data for training) and can be accessed within the electronic device 800.

The electronic device 800 may further include additional removable/non-removable, transitory/non-transitory, volatile/non-volatile storage medium. Although not shown in FIG. 8, a disk driver for reading from or writing to a removable, non-volatile disk (such as a "floppy disk"), and an optical disk driver for reading from or writing to a removable, non-volatile optical disk can be provided. In these cases, each driver may be connected to the bus (not shown) by one or more data medium interfaces. The memory 820 may include a computer program product 825, which has one or more program modules configured to perform various methods or acts of various embodiments of the present disclosure.

The communication unit 840 communicates with a further computing device through the communication medium. In addition, functions of components in the electronic device 800 may be implemented by a single computing cluster or multiple computing machines, which can communicate through a communication connection. Therefore, the electronic device 800 may be operated in a networking environment using a logical connection with one or more other servers, a network personal computer (PC), or another network node.

The input device 850 may be one or more input devices, such as a mouse, a keyboard, a trackball, etc. The output device 860 may be one or more output devices, such as a display, a speaker, a printer, etc. The electronic device 800 may also communicate with one or more external devices (not shown) through the communication unit 840 as required. The external device, such as a storage device, a display device, etc., communicate with one or more devices that enable users to interact with the electronic device 800, or communicate with any device (for example, a network card, a modem, etc.) that makes the electronic device 800 communicate with one or more other computing devices. Such communication may be executed via an input/output (I/O) interface (not shown).

According to example implementation of the present disclosure, a non-transitory computer-readable storage medium is provided, on which a computer-executable instruction or computer program is stored, where the computer-executable instructions or the computer program is executed by the processor to implement the method described above. According to example implementation of the present disclosure, a computer program product is also provided. The computer program product is physically stored on a non-transient computer-readable medium and includes computer-executable instructions, which are executed by the processor to implement the method described above.

Various aspects of the present disclosure are described herein with reference to the flow chart and/or the block diagram of the method, the device, the equipment and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, special computers or other programmable data processing devices to produce a machine that generates a device to implement the functions/acts specified in one or more blocks in the flow chart and/or the block diagram when these instructions are executed through the processing units of the computer or other programmable data processing devices. These computer-readable program instructions may also be stored in a computer-readable storage medium. These instructions enable a computer, a programmable data processing device and/or other devices to work in a specific way. Therefore, the computer-readable medium containing the instructions includes a product, which includes instructions to implement various aspects of the functions/acts specified in one or more blocks in the flowchart and/or the block diagram.

The computer-readable program instructions may be loaded onto a computer, other programmable data processing apparatus, or other devices, so that a series of operational steps can be performed on a computer, other programmable data processing apparatus, or other devices, to generate a computer-implemented process, such that the instructions which execute on a computer, other programmable data processing apparatus, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a module, a program segment or instructions, which contains one or more executable instructions for implementing the specified logic function. In some alternative implementations, the functions marked in the block may also occur in a different order from those marked in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is example, not exhaustive, and is not limited to the disclosed implementations. Without departing from the scope and spirit of the described implementations, many modifications and changes are obvious to ordinary skill in the art. The selection of terms used in this article aims to best explain the principles, practical application or improvement of technology in the market of each implementation, or to enable other ordinary skill in the art to understand the various embodiments disclosed herein.

The invention claimed is:

1. A method for image segmentation, comprising:

extracting an image feature representation of a target image using a trained image encoder;

for each class in a class set comprising a plurality of classes, generating, using a trained text encoder, a text feature representation corresponding to a name of the class, and determining a candidate segmentation map for the target image and a class confidence of the class for the target image based on the image feature representation and the text feature representation, the class confidence indicating a degree of matching between the class and the target image, the candidate segmentation map indicating whether respective pixels in the target image are classified into the class;

selecting, from the plurality of classes, at least one class related to the target image based on a comparison among a plurality of class confidences determined respectively for the plurality of classes; and determining a target segmentation map for the target image based on the at least one candidate segmentation map and the at least one class confidence determined for the at least one selected class, the target segmentation map indicating whether respective pixels in the target image are classified into a class amongst the at least one class.

2. The method of claim 1, wherein generating the text feature representation for each of the plurality of classes comprises:

generating at least one text sequence containing the name of the class;

extracting, using the text encoder, at least one sequence feature of the at least one text sequence respectively; and generating the text feature representation by aggregating the at least one sequence feature.

3. The method of claim 2, wherein the at least one text sequence comprises a plurality of different text sequences with each text sequence containing the name of the class.

4. The method of claim 2, wherein generating the at least one text sequence comprises:

generating the at least one text sequence by filling the name of the class into at least one prompt template, respectively.

5. The method of claim 1, wherein determining the candidate segmentation map for each of the plurality of classes comprises:

determining an attention map based on the text feature representation and the image feature representation, the attention map indicating a plurality of correlations between the class and a plurality of image blocks in the target image; and generating the candidate segmentation map by processing the attention map.

6. The method of claim 5, wherein generating the candidate segmentation map by processing the attention map comprises:

upsampling the attention map to a size corresponding to the target image, to obtain an upsampled attention map; and generating the candidate segmentation map by applying a conditional random field (CRF) process to the upsampled attention map.

7. The method of claim 5, wherein extracting the image feature representation comprises:

extracting a plurality of image features for the plurality of image blocks of the target image using the image encoder; and determining the image feature representation by aggregating the plurality of image features, and wherein determining the attention map comprises: determining the attention map based on the text feature representation and the plurality of image features.

8. The method of claim 1, wherein selecting at least one class comprises:

selecting a first number of classes from the plurality of classes based on the plurality of class confidences determined respectively for the plurality of classes;

determining a threshold confidence based on the first number of class confidences corresponding to the first number of classes respectively; and selecting, from the first number of classes, the at least one class with a corresponding class confidence exceeding the threshold confidence.

9. The method of claim 8, wherein determining the threshold confidence comprises:

determining the threshold confidence based on a mean and standard deviation of the first number of class confidences.

10. The method of claim 1, wherein the at least one selected class comprises at least two classes, and wherein determining the target segmentation map comprises:

for each pixel in the target image, determining that the pixel is classified into a target class amongst the at least two classes based on at least two class confidences corresponding to the at least two classes.

11. The method of claim 1, wherein the image encoder and the text encoder are trained based on unlabeled training data, the training data comprising sample image-text pairs.

12. An electronic device, comprising:

at least one processing unit; and at least one memory coupled to the at least one processing unit and storing instructions executable by the at least one processing unit, which, when executed by the at least one processing unit, cause the electronic device to perform acts comprising:

extracting an image feature representation of a target image using a trained image encoder;

for each class in a class set comprising a plurality of classes, generating, using a trained text encoder, a text feature representation corresponding to a name of the class, and determining a candidate segmentation map for the target image and a class confidence of the class for the target image based on the image feature representation and the text feature representation, the class confidence indicating a degree of matching between the class and the target image, the candidate segmentation map indicating whether respective pixels in the target image are classified into the class;

selecting, from the plurality of classes, at least one class related to the target image based on a comparison among a plurality of class confidences determined respectively for the plurality of classes; and determining a target segmentation map for the target image based on the at least one candidate segmentation map and the at least one class confidence determined for the at least one selected class, the target segmentation map indicating whether respective pixels in the target image are classified into a class amongst the at least one class.

13. The device of claim 12, wherein generating the text feature representation for each of the plurality of classes comprises:

generating at least one text sequence containing the name of the class;

extracting, using the text encoder, at least one sequence feature of the at least one text sequence respectively; and generating the text feature representation by aggregating the at least one sequence feature.

14. The device of claim 13, wherein generating the at least one text sequence comprises:

generating the at least one text sequence by filling the name of the class into at least one prompt template, respectively.

15. The device of claim 12, wherein determining the candidate segmentation map for each of the plurality of classes comprises:

determining an attention map based on the text feature representation and the image feature representation, the attention map indicating a plurality of correlations between the class and a plurality of image blocks in the target image; and generating the candidate segmentation map by processing the attention map.

16. The device of claim 15, wherein generating the candidate segmentation map by processing the attention map comprises:

upsampling the attention map to a size corresponding to the target image, to obtain an upsampled attention map; and generating the candidate segmentation map by applying a conditional random field (CRF) process to the upsampled attention map.

17. The device of claim 15, wherein extracting the image feature representation comprises:

extracting a plurality of image features for the plurality of image blocks of the target image using the image encoder; and determining the image feature representation by aggregating the plurality of image features, and wherein determining the attention map comprises: determining the attention map based on the text feature representation and the plurality of image features.

18. The device of claim 12, wherein selecting at least one class comprises:

selecting a first number of classes from the plurality of classes based on the plurality of class confidences determined respectively for the plurality of classes;

determining a threshold confidence based on the first number of class confidences corresponding to the first number of classes respectively; and selecting, from the first number of classes, the at least one class with a corresponding class confidence exceeding the threshold confidence.

19. The device of claim 12, wherein the at least one selected class comprises at least two classes, and wherein determining the target segmentation map comprises:

for each pixel in the target image, determining that the pixel is classified into a target class amongst the at least two classes based on at least two class confidences corresponding to the at least two classes.

20. A non-transitory computer-readable storage medium having a computer program stored thereon, the computer program, when executed by a processor, causing the processor to implement acts comprising:

extracting an image feature representation of a target image using a trained image encoder;

for each class in a class set comprising a plurality of classes, generating, using a trained text encoder, a text feature representation corresponding to a name of the class, and determining a candidate segmentation map for the target image and a class confidence of the class for the target image based on the image feature representation and the text feature representation, the class confidence indicating a degree of matching between the class and the target image, the candidate segmentation map indicating whether respective pixels in the target image are classified into the class;

selecting, from the plurality of classes, at least one class related to the target image based on a comparison among a plurality of class confidences determined respectively for the plurality of classes; and determining a target segmentation map for the target image based on the at least one candidate segmentation map and the at least one class confidence determined for the at least one selected class, the target segmentation map indicating whether respective pixels in the target image are classified into a class amongst the at least one class.

* * * * *